(12) United States Patent
Lisboa (10) Patent No.: US 9,084,071 B2
(45) Date of Patent: Jul. 14, 2015

(54) SIMPLE MOBILE REGISTRATION MECHANISM ENABLING AUTOMATIC REGISTRATION VIA MOBILE DEVICES

(76) Inventor: Michael-Anthony Lisboa, San Francisco, CA (US)

( * ) Notice: Subject to any disclaimer, the term of this patent is extended or adjusted under 35 U.S.C. 154(b) by 822 days.

(21) Appl. No.: 12/556,597

(22) Filed: Sep. 10, 2009

(65) Prior Publication Data

US 2011/0059727 A1    Mar. 10, 2011

(51) Int. Cl.
*H04W 4/00* (2009.01)
*H04L 12/58* (2006.01)

(52) U.S. Cl.
CPC . *H04W 4/00* (2013.01); *H04L 12/58* (2013.01)

(58) Field of Classification Search
CPC ....... H04W 12/08; H04W 4/008; H04W 4/22; H04W 12/12; H04M 2250/10; H04M 1/72547; H04M 1/72519; H04L 41/0233; H04L 41/0253; H04L 41/026; H04N 5/235
USPC ........... 455/433, 412.1, 439, 456.1, 457, 524, 455/435.2, 404.2, 435.3, 414.1, 418, 466, 455/422.1, 415, 456.3, 66.1, 423, 456.2, 455/521, 434, 410; 705/39, 40; 370/342, 370/329; 709/203, 223, 206
See application file for complete search history.

(56) References Cited

U.S. PATENT DOCUMENTS

| | | | | |
|---|---|---|---|---|
| 5,966,663 | A * | 10/1999 | Gleason | 455/466 |
| 6,587,691 | B1 * | 7/2003 | Granstam et al. | 455/456.1 |
| 7,440,433 | B2 * | 10/2008 | Rink et al. | 370/338 |
| 7,830,833 | B2 * | 11/2010 | Walker et al. | 370/329 |
| 8,024,398 | B2 * | 9/2011 | Cocotis et al. | 709/203 |
| 2002/0103693 | A1 * | 8/2002 | Bayer et al. | 705/10 |
| 2003/0033185 | A1 * | 2/2003 | Leto et al. | 705/8 |
| 2004/0039504 | A1 * | 2/2004 | Coffee et al. | 701/35 |
| 2004/0059946 | A1 * | 3/2004 | Price | 713/201 |
| 2004/0132429 | A1 * | 7/2004 | Gill et al. | 455/412.1 |
| 2004/0181303 | A1 * | 9/2004 | Walmsley | 700/115 |
| 2005/0147069 | A1 * | 7/2005 | Rink et al. | 370/338 |
| 2005/0177505 | A1 * | 8/2005 | Keeling et al. | 705/40 |
| 2005/0192893 | A1 * | 9/2005 | Keeling et al. | 705/39 |
| 2006/0014535 | A1 * | 1/2006 | Walker et al. | 455/433 |
| 2006/0084440 | A1 * | 4/2006 | Bakri | 455/439 |
| 2006/0133582 | A1 * | 6/2006 | McCulloch | 379/45 |
| 2006/0242287 | A1 * | 10/2006 | Cetin et al. | 709/223 |
| 2007/0121643 | A1 * | 5/2007 | Cunetto et al. | 370/395.3 |
| 2007/0289000 | A1 * | 12/2007 | Weiss | 726/5 |
| 2008/0028206 | A1 * | 1/2008 | Sicard et al. | 713/156 |

(Continued)

FOREIGN PATENT DOCUMENTS

WO    WO 02/091780 A1 *  5/2001   ............... H04Q 7/38

*Primary Examiner* — Joseph Arevalo
(74) *Attorney, Agent, or Firm* — Lyman H. Smith (57) ABSTRACT

Typically, when accessing a digital service or application, a user ("User") is often asked to register, requiring that he fill out forms, enter a Captcha code and validate his membership by reply email. This process becomes a tedious and unwieldy task when the User must do so on a mobile device. The more logical choice is for the User to sign up or to register in real time, with the very mobile device he is already using via a process and user interface designed for the mobile experience. Simple Mobile Registration ("SMR") is a one-step system for self-registration, authentication and account activation that provides simple and immediate access, via mobile device, to the features and functionality of third-party services or applications. Optionally, the User may, during the registration process, invite friends to also register in real time for the third-party services or applications.

10 Claims, 2 Drawing Sheets

(56) References Cited

U.S. PATENT DOCUMENTS

| | | | |
|---|---|---|---|
| 2008/0092213 A1* | 4/2008 | Wei et al. | 726/4 |
| 2008/0139173 A1* | 6/2008 | Yokobori et al. | 455/411 |
| 2008/0154770 A1* | 6/2008 | Rutherford et al. | 705/44 |
| 2008/0172737 A1* | 7/2008 | Shen et al. | 726/21 |
| 2008/0305792 A1* | 12/2008 | Khetawat et al. | 455/435.1 |
| 2009/0292641 A1* | 11/2009 | Weiss | 705/66 |
| 2010/0063935 A1* | 3/2010 | Thomas et al. | 705/325 |
| 2010/0199341 A1* | 8/2010 | Foti et al. | 726/9 |

\* cited by examiner

Figure 1

Simple Mobile Registration - Register Sender

Replacement Drawing for Application No. 12/556,597
Patent Title: Simple Mobile Registration Mechanism
Inventor: Michael-Anthony W. Lisboa

Figure 2

Simple Mobile Registration - Register a Third Party

Replacement Drawing for Application No. 12/556,597
Patent Title: Simple Mobile Registration Mechanism
Inventor: Michael-Anthony W. Lisboa

SIMPLE MOBILE REGISTRATION MECHANISM ENABLING AUTOMATIC REGISTRATION VIA MOBILE DEVICES

BACKGROUND OF THE INVENTION

Field of the Invention

Presently, any mobile device user who must register for a service generated over a mobile device can only do so via a Web browser with Internet connectivity and often requires access to an e-mail account for validation. The more logical choice is for that user to register in real time with the very mobile device he's already using, instead of searching for a computer with Internet connectivity.

The present invention is a one-step method and system for enabling a mobile device user to register, authenticate, and activate for simple and immediate access to functionality of a service or application, and optionally the invitation for registration of other third parties (i.e., friends), over a wireless communication network.

BRIEF SUMMARY OF THE INVENTION

Simple Mobile Registration ("SMR") is a method and a system that enables people ("users") to use mobile devices and their wireless messaging capabilities instead of a personal computer to sign-up or to register in real time for access to services (e.g., web services, e-commerce web sites, social media web sites, etc.) and applications, for example third-party software applications downloaded from mobile application repositories (e.g., Google Play, Apple App Store, etc.), delivered via a mobile device over a wireless network (e.g., Global System for Mobile Communications ["GSM"], Code Division Multiple Access ["CDMA"], Enhanced Data rates for GSM Evolution ["EDGE"], Wireless local area network ["WiFi"], Bluetooth, etc.).

Simple Mobile Registration is a method and system that allows users to send a registration request for themselves and optionally for their specified friends, from their mobile device (e.g., mobile phones, tablet devices, augmented reality head-mounted displays ("HMD")) via any existing or future messaging protocol to the Messaging and Processing System server, a "receiving system" of the Simple Mobile Registration method and system ("Receiving System"). Using any one of the available communication protocols, the Receiving System sends to the user's and his invited friends' (collectively, the Registrants") mobile devices a message containing a verification of the transaction (the "verification message"). Each Registrant verifies his intention to register by sending the verification back to the Receiving System. The Receiving System automatically identifies and validates each Registrant and his respective verification code, and then creates and activates an account that allows each new Registrant to access and use the service that required the pre-registration.

The SMR method and system consists of a user interface collaborating with a Software Application that governs the inter-workings of programmed routines and sub-routines, Messaging & Processing and User Data Management modules, and a standard messaging protocol, including but not in any way limited to Multimedia Messaging Service ("MMS"), Short Message Service ("SMS"), Simple Mail Transfer Protocol ("SMTP"), and HyperText Transfer Protocol ("HTTP").

BRIEF DESCRIPTION OF THE SEVERAL VIEWS OF THE DRAWINGS

The invention will be more fully understood, and further objects and advantages will become apparent in the following detailed description of the accompanying diagrams.

KEY TO REFERENCE NUMBERS

101=A user (i.e., sender) has a mobile device with messaging capability and intends to use the device to sign up (register) himself with a service or application. Example: John Doe wishes to register for a membership with MajorLeague-Baseball.TV (the "Service"). John is walking in the street and uses MMS or SMS to sign up for a membership with his cell phone.

101$a$=The mobile device user sends a message to a Service.

102=The Messaging and Processing System is triggered.

103=The Messaging and Processing System checks the user's information.

104=If the user is currently registered, no further action is required (unless other individuals have been included in the message—see FIG. 2).

104$a$=If the user is not registered, the User Data Management System creates a unique record for that user within the User Data Management System identifying the user's registration status as "unregistered."

105=If user is not registered, the system stores his unique identifier (e.g., Mobile Systems International Subscriber Identity Number ("MSISDN"), Unique Device ID ("UDID") in the User Data Management System.

106/106$a$=The Messaging & Processing System then sends the user a verification message for example a one-time password ("OTP") or verification through a third-party system, as well as any instructions required by the user to continue the process, and, if applicable, to use the service or application after registration is complete.

107/107$a$=When the user receives the verification message on his mobile device, he must return a response message to the Messaging and Processing System (actively or passively), in order to verify his desire to register.

108=The Messaging and Processing System receives the verification message from the user.

109=Upon receipt of the verification message from the user, the Messaging and Processing System updates that user's record in the User Data Management System with information identifying him as an activated or registered user.

110=If the verification message is not received, then the user is not registered until it is.

111=The registration for this user is completed, and the system initiates any further actions associated with the receipt of the user's original message (at 104$a$).

KEY TO REFERENCE NUMBERS

201=A user (i.e., sender) has a mobile device, such as a cell phone, with messaging capability and intends to use the device to invite third parties (e.g., friends) to sign up (register) with a Service.

201a=The User included information and Identifiers (e.g., MSISDN) for other potential recipients of the message (i.e., Invitees), triggering the Messaging and Processing System.

202=The Messaging and Processing System initiates an additional sequence of actions based on this information, as follows.

203/204=Captures the Identifiers for the Invitees, and checks the User Data Management System to see if any of the Invitees are currently registered.

204a=For any already-registered Invitees, no further action is required except for the normal operations performed by the SMR System to complete the Simple Mobile Registration and/or by the Service or application.

205=If included Invitees are not registered, the Messaging and Processing System creates a unique record for each such unregistered Invitee within the User Data Management System, where they are each identified as an unregistered user.

206/206a=The Messaging and Processing System then sends a message to each of the Invitees, using their mobile device phone number, or email address, or IP address, consisting of the following: (a) an invitation to register with the Service or application, and (b) a unique code specified by the Messaging and Processing System, and (c) any instructions required for the unregistered Invitee to complete the registration process and, if applicable, instructions for functions provided by the SMR System and/or the Service or application once registration is completed.

207/207a=When the Invitee receives the verification message in his mobile device, he must return a response message to the Messaging and Processing System (actively or passively) to verify his registration.

208/209=The Messaging and Processing System is programmed to perform one of two actions at this stage.

210=If the Messaging and Processing System does not receive a verification message from the User, then the User is not registered.

211=If the Messaging and Processing System does receive the verification message, then it (a) validates the User, (b) updates the newly registered User's record in the User Data Management System with information identifying him as an activated or registered User, thus completing the registration for this new User (and former Invitee).

DETAILED DESCRIPTION OF THE INVENTION

Simple Mobile Registration is a method and system that allows users to send a registration request for themselves and optionally for their specified friends, from their mobile device via any existing messaging protocol, such as, but not limited to, Short Message Service ("SMS"), Multimedia Messaging Service ("MMS"), Simple Mail Transfer Protocol ("SMTP"), and HyperText Transfer Protocol ("HTTP") (collectively referred to herein as the "Communication Protocols"), to the Messaging and Processing System, a "receiving system" module of the Simple Mobile Registration system ("Receiving System").

The Receiving System (1) returns a verification message to the user's and his specified friends' (collectively, the "Registrants") mobile devices, also via one of the communication protocols. Each Registrant verifies his intention to register by sending the verification message back to the Receiving System. The Receiving System automatically identifies and validates each Registrant and his respective verification message, and then creates a registration account that allows each new Registrant to access and use the service that required the pre-registration.

Simple Mobile Registration requires the following hardware, software, and components to function, and the total of those hardware, software, and components is collectively referred to herein as the "SMR System":

Hardware: Any mobile device, such as, but not limited to, mobile phones, tablet devices, and augmented reality head-mounted displays ("HMD"), using a Communication Protocol for transmitting messages from one person to a service or application or to one or more separate persons (the "Message").

SMR Software Application: The underlying software application (the "SMR Software Application") governing the Simple Mobile Registration system performs the following functions: (1) accepts and identifies specific identifiers or the lack of such identifiers in Messages, (2) distinguishes the difference between primary, unique identifiers, such as MSISDN, UDID, email addresses, and Internet Protocol ("IP") addresses, and other identifiers, such as a request to register the sender, a request to invite the sender's friends to register along with him, keywords, symbols, tags, and labels, and/or any other specific identifier in the subject line or in the body of a Message (collectively, the "Identifiers"), (3) deciphers the meaning and purpose of the Identifiers or of the lack of an Identifier (such as, for instance, using an asterisk between open and closed carat marks to signify that the SMR Software Application must perform a specific activity), and (4) processes and/or performs the actions required by any Identifier or lack of an Identifier, which actions will be implemented by means of a variety of routines and sub-routines that are written into the SMR Software Application, including, but not limited to, the following examples:

a. Receiving a Message containing a primary, unique Identifier the Software Application does not recognize. If a prospective registrant (the "user") sends an electronic message to an address associated with the SMR Software Application from a mobile device that is not already recognized in the SMR System's User Data Management System, then the SMR Software Application will first verify, through a series of specific, coded routines, that the Message was sent by a legitimate sender, after which it will perform one of the following activities:

i. If from a legitimate sender, the SMR Software Application confirms that the User wishes to register himself and/or to invite others to register (the "Invitees"), and then processes the registration, which includes giving the sender a series of choices, such as, but not limited to opt-in/opt-out privacy and other similar user-associated choices. In all cases in which SMR is invoked, the registrant may be the original user or any one or all of the Invitees that sequentially derive from the original User and then from Invitees themselves, ad infinitum.

ii. If not from a legitimate sender, the SMR Software Application terminates all activity with respect to that Message.

b. Receiving a Message from a User who is or is not already registered, and which Message includes transmission information for Invitees, some, or all of whose unique Identifiers are not in the user database.

The SMR System looks for a unique user-associated Identifier in a mobile device message, such as, but not limited to a cellular carrier's name, or an IP address, or an MSISDN. If one or more of the Identifiers are not in the registered-user database, then the SMR System flags the message as coming from a potentially unacceptable sender (the SMR Software Application is written to "recognize" specific Identifiers in the subject line or in the body of the Message.) In such a case, the SMR Software Application will (i) first verify that the Message was sent by a legitimate sender, then (ii) confirm that the user wishes to register himself and/or to invite others to register (the "Invitees"), (iii) verify that each Invitee is legitimate and unregistered, and (iv) if so, expedite the Registration, which includes giving the sender a series of choices, such as, but not limited to opt-in/opt-out privacy and other similar user-associated choices. In all cases in which SMR is invoked, the registrant may be the original user or any one or all of the Invitees that sequentially derive from the original user and then from Invitees themselves, ad infinitum.

However, if the SMR Software Application determines (i) that an unregistered sender is not legitimate, then all activity with respect to that Message is terminated, or (ii) that a registered sender has provided defective Invitee information, then the System generates an alert to the sender that such information is defective and the invitation request for that defective Invitee alone will be terminated.

c. If a user sends an electronic message (or uses any other Communication Protocol to transmit his message) to a service or application that uses the SMR Software Application to process Registrations, such as enrolling for a membership or signing up for a subscription to a service or application, and the message is addressed to an MSISDN or email address assigned by a carrier or by the service or application provider, and/or the message has other legitimate Identifiers in the subject line or in the body, the SMR Software Application is written to discern the presence of acceptable Identifiers and will initiate a series of automatic, electronic routines whose collective purpose is (i) confirming that the user wishes to register for an offered service, or to enroll in a specific group, or to sign up to benefit from an offered application (together, the "Service"), and (ii) confirming whether the user has provided appropriate information indicating his desire to invite friends to enroll (the "Invitees"), then the SMR Software Application expedites the Registration, and provides the sender a series of choices related to the sender's preferences. An example of the use of SMR for these types of Service Registrations includes the following:

A Sponsorship Sign-Up example using MMS. It's 10:00 p.m. and XYZ Company's and ABC Company's Chief Marketing Officers are attending an industry event with their peers. They hear of an advantageous sponsorship opportunity on AllSportCelebrities.com and learn that there is only one such opportunity remaining. The Chief Marketing Officer of ABC Company ("ABC CMO") pulls out his mobile phone, and sends an MMS message to marketing@AllSportCelebrities.com, which is known to use SMR. Simultaneously, the Chief Marketing Officer of XYZ Company ("XYZ CMO") goes in search of a personal computer with an Internet connection.

10:01:30 p.m., the ABC CMO finishes composing his message requesting the sponsorship opportunity and sends it, triggering the following activities: 10:02:00 p.m., SMR delivers the following message to the ABC CMO:

Welcome to [etc.] We received your request for a [Name of] sponsorship opportunity. Please verify that you made this request by returning this message to us (just hit "Reply"). Upon receipt, you will be assigned a Sponsor Account.

Sincerely,

AllSportsCelebrities.com

Communication Code No. 89034.

10:02:10 p.m. AllSportCelebrities.com's SMR verifies ABC CMO is as a legitimate sender and the sponsorship opportunity is reserved for the ABC CMO.

10:02:40 p.m. ABC CMO returns the message containing the Communication Code Account number.

10:02:55 p.m. SMR delivers the following validation message to the ABC CMO:

Subject Line: Validation Notice—Sponsor Account No. 89034

As you requested, we created Sponsor Account No. 89034 for

ABC Company and reserved a [Name of] sponsor opportunity for you.

Next day: The XYZ CMO, unaware that the last sponsorship opportunity had been given to ABC CMO, could not locate a computer and was forced to wait until the next day to communicate with AllSportCelebrities.com.

Note that only non-transitory computer-readable media are within the scope of the SMR System, and the SMR Software Application.

Components: "Must-have" components and elements necessary for the proper functioning of the SMR System include, but are not limited to any one or combination of the following:

a. A mobile device MSISDN, e.g., a cellular telephone number that is assigned by a cellular telephone company, such as AT&T and Verizon, or an email address from a mobile communication network provider, or an IP address.

b. A mobile device with MMS, SMS, SMTP, HTTP and/or any other communication protocol that allows in/out transmission of messages.

c. User databases.

d. Identifiers, such as more explicitly described herein.

There are four principal modules in the Simple Mobile Registration System. Because all of the parts that make up Simple Mobile Registration consist of software, or a combination of software and hardware (those parts together referenced herein as the "Sub-Applications"), the SMR Software Application modules work together by communicating via a variety of software protocols, including, but not limited to, proprietary protocols compiled within the Sub-Applications, as well as standard communication protocols, such as, but not limited to, MMS, SMS, SMTP, HTTP, and any other similar communication protocols, formats or messaging methods that may become of standard usage. The Sub-Applications themselves may consist of (and operate on) any number of devices, including servers, mobile devices, and telecommunications equipment required by any of the aforementioned messaging protocols, formats, or methods.

The four principal Simple Mobile Registration modules are the messaging and processing system, the user data management system, a user interface to the messaging and processing system, and a separate module for when the Simple Mobile Registration System is included in any of a variety of third-party Services that would benefit from an easy way for users to register, enroll, or sign-up for a Service or application from their mobile devices.

The Messaging and Processing System (the "M&P System"), which is the foundation of the SMR System. It governs the inter-workings and communications by and among the principal parts of the SMR System and makes possible communications between the SMR Software Application and a user's mobile device. The M&P System is able to process received Messages and to initiate other actions or messages.

This M&P System, an integral part of the SMR System, recognizes and interprets various commands or Identifiers within a Message that specifies a Registration and is able to send and receive Messages in the required format (such as, but not limited to, Short Message Service ("SMS"), Multimedia Messaging Service ("MMS"), Simple Mail Transfer Protocol ("SMTP"), and HyperText Transfer Protocol ("HTTP"). The M&P System's principal functions are to (i) identify and validate a registered member, (ii) to identify, verify, and validate a new member and his registration data and information, (iii) to electronically determine that the individual sending a message is or is not a registered member, (iv) to determine when information or Identifers present in a user's Message refer to Invitees, and to initiate the registration process with those Invitees, and (v) to process towards fulfillment any other activity that is requested in the Message.

The User Data Management System contains records of all existing registered users of a Service, including any information and Identifiers required to communicate with them via their mobile device. The User Data Management System consists of information contributed by each person or entity that uses the Simple Mobile Registration System or some other means of registration or sign-up, and serves as an organized receptacle of stored information and data about registered users and Invitees, based primarily on their unique MSISDN and/or email addresses, as and on information and data about their activities, their mobile devices, and other relevant information and data.

A user interface to the Messaging and Processing System, which may be provided in any of the following structures:

(i) As a standalone software application for mobile devices or computers, or (ii) As a Web page-based or WAP-page based interface, or (iii) As a "widget," i.e., a portable piece of software code that can be installed on a mobile device or computer.

The M&P System user interface allows new user registration via any electronic and mobile device capable of messaging by providing the means for sending messages in formats that require such an interface such as, but not limited to, SMS, MMS, SMTP, and HTTP.

A separate module for when the Simple Mobile Registration System is included in any of a variety of third-party Services that would benefit from an easy way for users to register, enroll, or sign-up for a Service or application from their mobile devices. This module includes, but is not limited to, any Service or application that employs SMR for gathering user information and data that is provided in a mobile device Message, and then processing the information and data to enroll the user in such Service. Any such Service that employs Simple Mobile Registration can consist of any number of components and functions that are not relevant to the Simple Mobile Registration system itself. Simple Mobile Registration is written to ignore irrelevant components and functions (which may or may not be ultimately reviewed in a customer service quality assurance process).

The component that serves as the foundation of Simple Mobile Registration is the Messaging and Processing Service, which governs the inter-workings and communication by and among the principal parts described herein, enabling and activating Simple Mobile Registration. All of these components, including the Messaging and Processing Service, may be included in a broader software application.

Because all of the SMR parts and modules consist of software, or a combination of software and hardware, they work together by communication via a variety of software protocols, including, but not limited to, proprietary protocols compiled within the applications, as well as standard messaging and communication protocols, or methods that are or may in the future become of standard usage. The software applications themselves may operate on a variety of devices, including servers, mobile devices, and telecommunications equipment required by any of the messaging methods.

To date, the principal and sole method for registration or sign-up of users, including the capture and storage of user information and preferences, is achieved on Internet-based sites that use off-the-shelf or proprietary systems for registering and/or signing up users of these sites' services or offerings.

The Simple Mobile Registration system, made up of a combination of proprietary software, hardware, Identifiers, SMR databases, MSISDN, email addresses, and other Identifiers, enable mobile devices to automatically and electronically log, verify, validate, and create a permanent member, subscriber, or other user account.

The Simple Mobile Registration System uses information and data provided by the user to seamlessly register and/or sign up, in real time, by mobile device, any number of users of any electronic Service or application that requires the user to create a user account before he is allowed to use such Service or application. Simple Mobile Registration performs the following functions simultaneously and in real time:

1. Allows a user to use his mobile device to seamlessly create a user account.
2. Allows a user to invite any number of other people to register for the Service.
3. Spontaneously verifies, validates, creates, and keeps track of each new account.
4. Allows the Simple Mobile Registration System to communicate with each user by mobile device over a wireless network.
5. Issues to each new registrant access to the Service or application.
6. Optional: Transfers the message for quality assurance and customer service review.

When sending an electronic message in any messaging protocol by mobile device, individuals already registered for a Service or application, or individuals who are registering for the first time for such Service or application, using the Simple Mobile Registration System, may invite non-registered individuals ("Invitees") by including them as recipients of the Message (a message usually but not necessarily always making a registration request) by entering each Invitees' MSISDN, IP address, or email address, and/or supplementing the Message with identifiers that include, but are not limited to, specific keywords, symbols, tags, labels, and any other specific identifier that the Messaging and Processing System finds in the subject line or in the body of the Message (collectively, the "Identifiers"). When this information is sent to the Service or application employing SMR, the Messaging and Processing System checks whether the requested Invitees exist in their records, and sends each of them an invitation registration message on behalf of the original registrant via the aforementioned SMR process, and as more explicitly described below.

Step 1—Mobile Device User Initiates the Simple Mobile Registration System by Sending an Electronic Message. A mobile device user sends an message from his mobile device, e.g., mobile phones, tablet devices, augmented reality head-mounted displays ("HMD"), or any current and future mobile devices that use Multimedia Messaging Service, Short Message Service, Simple Mail Transfer Protocol, HyperText Transfer Protocol, or any another communication protocol, format, or method to transmit messages from one person to a Service or to one or more separate persons.

Step 2—The Electronic Message Messaging and Processing System Identifies Users' Message Requests. The message contains an Identifier, i.e., a code, MSISDN, email address, a keyword, or other identifying symbol, tag, or label that is either provided by the user or by the SMR System that identifies the message to the Messaging and Processing System as a registration request and/or a request to invite other users (by manually including in the message the unique Identifiers for these other individuals for whom the user wishes to initiate Simple Mobile Registration).

Figure 1:
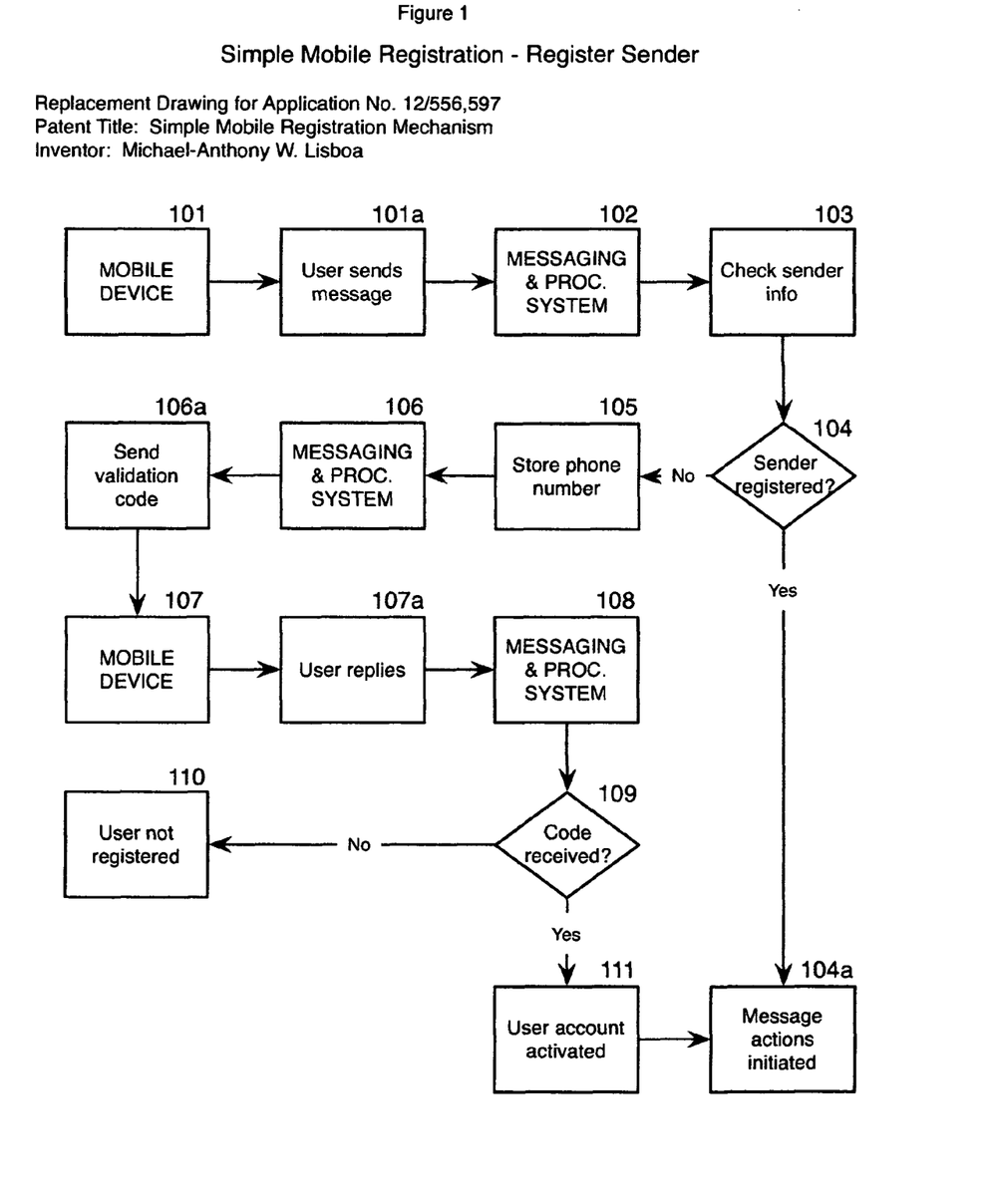
FIG. 1 (of 2) is a diagram of Simple Mobile Registration as used by persons who wish to sign themselves up with their mobile device for any electronic service requiring pre-registration. Presently, any user who must register for a service generated on a mobile device can only do so via personal computer equipped with email and Internet connectivity. The more logical choice is for that user to register in real time and without need for Internet connectivity with the very mobile device he's already using, instead of searching for a computer with Internet connectivity.

Step 2(a)—The Messaging and Processing System Processes the Message and Included Data (FIG. 1). When the user 101 sends a message containing the Identifiers and other relevant information 101a, the Messaging and Processing System 102 performs the functions listed in this Step 2(a) and in the following Steps 2(b) and 2(c):

i. Captures the user's unique identifying information, such as, but not limited to, mobile service carrier name and MSISDN, an IP address, browser, cookie, and service provider information, and other identifiers, including but not limited to a coded request to register the sender, a request to invite the sender's friends to register along with him, a list of keywords, symbols, tags, and labels, and/or any other specific identifier in the subject line or in the body of a Message (collectively, the "Identifiers").

ii. Checks the User Data Management System to see if the user is currently registered 103. If the user is currently registered, no further action is required except for normal system operations 104a (unless other individuals have been included in the message—see Step 2(b)).

iii. If the user is not registered, the User Data Management System creates a unique record for that user within the user Data Management System 105, identifying the user's registration status as "unregistered." The Messaging & Processing System 106 then sends the user a message for example a one-time password ("OTP") or verification through a third-party authentication system, as well as any instructions required by the user to continue the process, and, if applicable, to use the service or application after registration is complete 106a.

iv. When the user receives the verification message on his mobile device 107, he must return a response message to the Messaging and Processing System (actively or passively) and include the unique verification message that was included in the message he received, in order to verify his desire to register 107a.

v. Upon receipt of the verification message from the user, the Messaging and Processing System 108 (a) updates that user's record in the User Data Management System with information identifying him as an activated or registered user, completing the registration for this user 111, and (b) then initiates any further actions associated with the receipt of the user's original message 104a, such as, but not limited to, (x) applying the SMR System to Invitees (as more explicitly described in Step 2(b)), and unless the Messaging and Processing System terminated activity because of defective or missing unique Identifiers, (y) diverting a copy of the Message to a person-monitored customer service department for final review to ensure that all user requests have been attended to. If the user does not send a verification message, registration is not completed 110.

Figure 2:
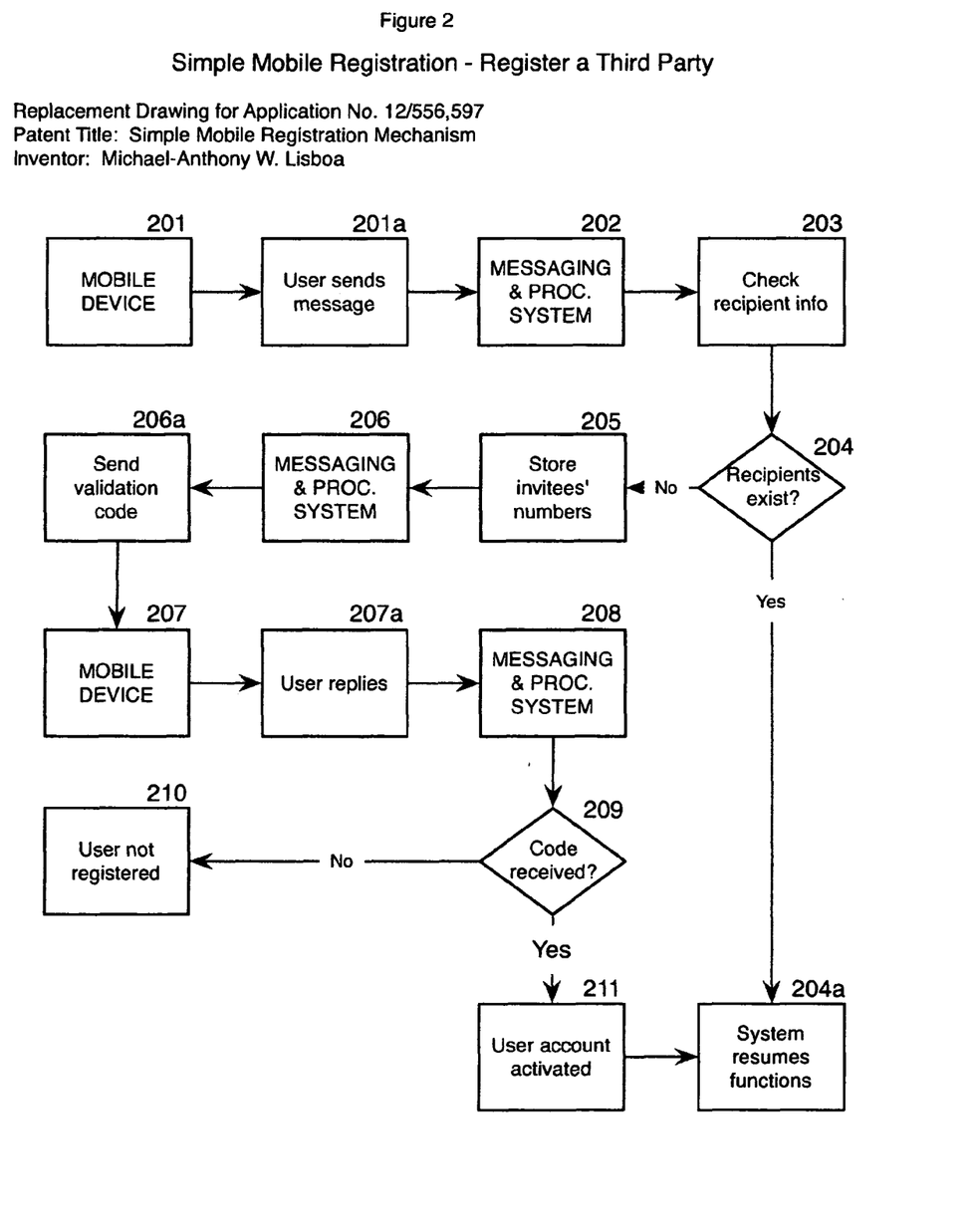
FIG. 2 (of 2) is a diagram of Simple Mobile Registration as used by persons who wish to register other third parties (such as friends) with their mobile device for any service or application requiring pre-registration.

Step 2(b)—The Simple Mobile Registration Process Simultaneously Captures and Processes Information and Data for Specified Recipients of the User's Message (FIG. 2). If the user 201 included information and Identifiers for other potential recipients of the message (i.e., Invitees), the Messaging and Processing System 202 initiates an additional sequence of actions based on this information:

i. Captures the Identifiers for the Invitees, and checks the User Data Management System to see if any of the Invitees are currently registered 203, 204. For any already-registered Invitees, no further action is required except for the normal operations performed by the SMR System to complete the Simple Mobile Registration and/or by the overall Service or application 204a.

ii. If included Invitees are not registered, the Messaging and Processing System creates a unique record for each such unregistered Invitee within the User Data Management System, where they are each identified as an unregistered user 205. The Messaging and Processing System 206 then sends a message 206a to each of the Invitees, using their mobile device MSISDN, or email address, or IP address, consisting of the following: (a) an invitation to register with the Service or application, and (b) a unique code specified by the Messaging and Processing System, and (c) any instructions required for the unregistered Invitee to complete the registration process and, if applicable, instructions for functions provided by the SMR System and/or the overall Service or application once registration is completed.

ii. When the Invitee receives the verification message in his mobile device 207, he must return a response message to the Messaging and Processing System (actively or passively) to verify his registration 207a.

iii. Upon receipt of the verification message, the Messaging and Processing System 208, 209 (a) validates the user, (b) updates the newly registered user's record in the User Data Management System with information identifying him as an activated or registered user 211, thus completing the registration for this new user (and former Invitee), (c) implements any further actions associated with the receipt of the Message from the original user who initiated the invitation 204a and (d) may or may not divert a copy of the Message to a person-monitored customer service department for final quality assurance review and to ensure that all user requests have been attended to properly.

Step 2(c)—The Simple Mobile Registration System Monitors Message Senders' Registration Status. The Simple Mobile Registration System is written to search and find a unique user-associated Identifier in a mobile device message, such as, but not limited to, a cellular carrier's name, an IP address, MSISDN, a keyword, tag, or symbol. If one or more of the Identifiers are not in the registered-user database, then the SMR System flags the message as coming from a potentially unacceptable sender. In such a case, the SMR System will:

(i) First verify that the message was sent by a legitimate sender; then confirm that the user wishes to register himself and/or to invite others to register (the Invitees); verify that each Invitee is legitimate and unregistered; and if so, expedite the registration process, which includes giving the sender a series of choices, such as, but not limited to opt-in/opt-out privacy and other similar user-associated choices. In all cases in which SMR is invoked, the registrant may be the original user or any one or all of the Invitees that sequentially derive from the original user and then from Invitees themselves.

(ii) However, if the SMR Software Application determines (a) that an unregistered sender is not legitimate, then all activity with respect to that message is terminated, or (b) that a registered sender has provided defective Invitee information, then the System generates an alert to the sender that such information is defective and the invitation request for that defective Invitee alone will be terminated.

Step 3—The Simple Mobile Registration System May Be Used For Any Service or Application That Requires Capturing, Organizing, Storing, and Retrieving User Information. If a user sends a message (or uses any other communication protocol to transmit his message) to a Service or application that uses the SMR Software Application to process sign-ups and/or registrations, such as enrolling for a membership or for a subscription to a service, and the message is addressed to an MSISDN or email address assigned by a carrier or by the service or application, and/or the message has other legitimate Identifiers in the subject line or in the body, the SMR Software Application is written to discern the presence of acceptable Identifiers and will initiate a series of automatic, electronic routines whose collective purpose is (a) to confirm that the message sender wishes to enroll for a specific service, or to enroll in a specific group, or to sign up to benefit from a specific application (together, the "Service"), and (b) to confirm whether the user has provided appropriate information indicating his desire to invite friends to enroll (i.e., the Invitees), then the SMR Software Application expedites the enrollment/sign-up/registration process, including, but not limited to, providing the sender a series of choices related to the sender's preferences.

In all cases in which SMR is invoked, the registrant may be the original message sender or any one or all of the Invitees that sequentially derive from the original sender and then from Invitees themselves.

Although Simple Mobile Registration has been designed to allow people to register for any service that maintains electronic records of authorized users and that requires a registration process, this same Simple Mobile Registration System may be applied to identity-verification schemes that rely on the exchange of data between a user and an electronic system, such as, but not limited to the following examples:

1. Signing up for a contest.
2. Signing up to receive something that will be delivered by post or some other non-computerized delivery system.
3. Registering for membership with an organization that provides services on any medium that is capable of messaging, including, but not limited to, a mobile device, a Web site, or a WAP site.
4. Registering for any third-party service that is offered on any medium that is capable of messaging, such as, but not limited to, a mobile device, a Web site, or a WAP site.

The overall objective of SMR is to achieve (i) easier, faster, and more convenient registration, enrollment, or sign-up (collectively referred to herein as "Registration") than is presently possible because nothing like the Simple Mobile Registration Application is to date available via mobile device, and (ii) the gathering and processing of user-, provider/vendor-, and mobile device carrier-provided data, information, and requests via not just computers and Web pages, which is the standard method, but also via any mobile device that is capable of transmitting and receiving messages.

The components used to structure and to implement Simple Mobile Registration may vary in their specific implementation. The underlying code that governs the process, functions and sequence (the "Process") of Simple Mobile Registration may be customized to a specific situation. Further, because the Simple Mobile Registration mechanism is governed in large part by software code, it may, for example, be implemented in a number of different programming languages. The electronic and telecommunications equipment and other hardware associated with the software could likewise take any number of forms as designed by their manufacturers. For example, there are distinct (and often proprietary) differences in the design and structure of a Nokia cell phone versus a Samsung cell phone. For the purposes of the messaging required by the Process, messages could be sent in protocols other than Short Message Service ("SMS"), Multimedia Messaging Service ("MMS"), Simple Mail Transfer Protocol ("SMTP"), and HyperText Transfer Protocol ("HTTP") messages. For example, messages could be sent as Bluetooth Messaging Service ("BMS") messages over a Bluetooth network, or any of a number of other Communication Protocols used for sending messages over wireless networks.

The invention claimed is:

1. A method for providing automatic registration or authentication access to a third party service or application via a wireless network, comprising the steps of:

connecting a mobile device to a server via the wireless network using a communication protocol in the service or application, the server includes a Simple Mobile Registration ("SMR") Messaging and Processing System, the SMR Messaging and Processing System performing the steps of sending a message from the mobile device to the SMR Messaging and Processing System;

returning a verification message to the message sender;

evaluating at least one of a mobile device user and a mobile device identification based on specific and unique information provided by at least one of the mobile device and the wireless network, searching an SMR User Data Management System, a module of SMR Messaging and Processing system, to determine whether the message sender is already registered or not comprising further the steps of:

querying a database to determine whether there is already a registered account associated with specific and unique identification, and if no account exists for the specific and unique identification, providing access to the third party service or application;

identifying a registered user account assigned to at least one of the mobile device user and the mobile device identification, and registering or authenticating, by the SMR Messaging and Processing System, at least one of the mobile device user and the mobile device identification to the third party service or application based on specific information provided by at least one of the mobile device and the wireless network, wherein returning the verification message comprises the step of directing the verification message to the mobile user identified by the unique information comprising an email address assigned by a mobile device carrier, or a wireless network, or an Internet Protocol address ("IP address"), or an MSISDN or a browser, cookie, or service provider information.

2. The method of claim 1, wherein the step of sending a message from the mobile device to the Simple Mobile Registration ("SMR") Messaging and Processing System, begins by:
permitting users to invite friends to register to the third party service or application by including tags, labels, Mobile Systems International Subscriber Identity Number ("MSISDN"), email address, or other identifying information,
identifying and validating a message sender,
replying to SMR Messaging and Processing System with the verification message,
creating a new registration account, and
accessing third-party services or applications.

3. The method according to claim 1 wherein receiving the message comprises the SMR Messaging and Processing System automatically recognizing, capturing, and interpreting symbols, tags, labels, coded requests, and other identifying information provided by the user or by the SMR Messaging and Processing system on a subject line or in a body of the message.

4. The method of claim 1 wherein the step of searching the SMR User Data Management System, to determine whether the message sender is already registered or not, comprises further the steps of: if no account exists for the specific and unique identification, creating a new user account in a user database system of the third party service
or application, storing user specific data associated with the new user account in the database system of the third party service or application.

5. The method of claim 1 wherein the SMR Messaging and Processing system verifies the message sender's registration status, comprising the steps of: stopping registration functions as to the message sender if it is determined that the message sender is already registered, if not already registered, storing the message sender's unique, primary identifiers in an SMR User Data Management System, and sending the verification message to the user's mobile device.

6. The method of claim 1 comprising the step of the SMR Messaging and Processing system verifying whether the message sender requested registration invitations for friends or Invitees and determining whether any of the Invitees are already registered, comprising further the steps of: querying a database to determine whether there is already a registered account associated with specific and unique identification of each Invitee, and if no account exists for the specific and unique identification, creating a
new user account for each Invitee in a database system of the service or application user, and storing the user specific data associated with new user account(s) in the database system of the service or application.

7. The method of claim 6 further comprising the steps of the SMR Messaging and Processing system verifying the status of Invitees by:
determining whether any of the Invitees are registered or unregistered,
stopping registration functions for a first specific Invitee if it is determined that the first specific Invitee is already registered,
sending a notification message to Invitees determined to be unregistered, and inviting them to register for the service or application,
stopping registration functions for Invitees who decline to register,
stopping registration functions as to a second specific Invitee if the supplied identification data is incorrect or defective,
deleting database entries for Invitees who have declined to register or have not registered within a designated time period,
sending the verification message to the mobile device of Invitees who choose to register for the service or application, and
providing access to Invitees to the service or application.

8. A method for providing automatic registration or authentication access to a service or application via a wireless network, comprising the steps of:
connecting a mobile device to a server via the wireless network using a communication protocol in the service or application, the server includes a Simple Mobile Registration ("SMR") Messaging and Processing System, the SMR Messaging and Processing System performing the steps of
evaluating at least one of a mobile device user and a mobile device identification based on specific and unique information provided by at least one of the mobile device and the wireless network,
identifying a registered user account assigned to at least one of the mobile device user and the mobile device identification, and
registering or authenticating, by the SMR Messaging and Processing System, at least one of the mobile device user and the mobile device identification to the service or application based on specific information provided by at least one of the mobile device and the wireless network,
wherein the SMR Messaging and Processing system verifies the message sender's registration status, comprising the steps of:
stopping registration functions as to the message sender if it is determined that the message sender is already registered,
if not already registered, storing the message sender's unique, primary identifiers in an SMR User Data Management System, and
sending the verification message to the user's mobile device.

9. A method for providing automatic registration or authentication access to a service or application via a wireless network, comprising the steps of:
connecting a mobile device to a server via the wireless network using a communication protocol in the service or application, the server includes a Simple Mobile Registration ("SMR") Messaging and Processing System, the SMR Messaging and Processing System performing the steps of
evaluating at least one of a mobile device user and a mobile device identification based on specific and unique information provided by at least one of the mobile device and the wireless network,
identifying a registered user account assigned to at least one of the mobile device user and the mobile device identification,
registering or authenticating, by the SMR Messaging and Processing System, at least one of the mobile device user and the mobile device identification to the service or application based on specific information provided by at least one of the mobile device and the wireless network; and verifying whether the message sender requested registration invitations for friends or Invitees and determining whether any of the Invitees are already registered, comprising further the steps of:
- querying a database to determine whether there is already a registered account associated with specific and unique identification of each Invitee, and
- if no account exists for the specific and unique identification, creating a new user account for each Invitee in a database system of the service or application user, and
- storing the user specific data associated with new user account(s) in the database system of the service or application.

10. A method for providing automatic registration or authentication access to a third party service or application via a wireless network, comprising the steps of:
- connecting a mobile device to a server via the wireless network using a communication protocol in the service or application, the server includes a Simple Mobile Registration ("SMR") Messaging and Processing System, the SMR Messaging and Processing System performing the steps of
- sending a message from the mobile device to the SMR Messaging and Processing System;
- evaluating at least one of a mobile device user and a mobile device identification based on specific and unique information provided by at least one of the mobile device and the wireless network, wherein the SMR Messaging and Processing system verifies the message sender's registration status via the steps of:
  - stopping registration functions as to the message sender if it is determined that the message sender is already registered,
  - if not already registered, storing the message sender's unique, primary identifiers in an SMR User Data Management System, and
  - sending the verification message to the user's mobile device, and
  - storing the user specific data associated with new user account(s) in the database system of the service or application.

* * * * *